United States Patent
Okamura et al.

(10) Patent No.: US 9,081,139 B2
(45) Date of Patent: Jul. 14, 2015

(54) OPTICAL WAVEGUIDE DEVICE

(75) Inventors: Miki Okamura, Tokyo (JP); Ryo Shimizu, Tokyo (JP); Yasuhiro Ishikawa, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 13/498,589

(22) PCT Filed: Sep. 24, 2010

(86) PCT No.: PCT/JP2010/066580
§ 371 (c)(1),
(2), (4) Date: Mar. 28, 2012

(87) PCT Pub. No.: WO2011/040339
PCT Pub. Date: Apr. 7, 2011

(65) Prior Publication Data
US 2012/0183252 A1    Jul. 19, 2012

(30) Foreign Application Priority Data
Sep. 30, 2009    (JP) .................... 2009-225725

(51) Int. Cl.
G02F 1/035    (2006.01)
G02B 6/125    (2006.01)
G02B 6/27     (2006.01)
G02B 6/12     (2006.01)
G02F 1/225    (2006.01)

(52) U.S. Cl.
CPC .............. *G02B 6/125* (2013.01); *G02B 6/2713* (2013.01); *G02B 6/2773* (2013.01); *G02B 2006/12142* (2013.01); *G02F 1/2255* (2013.01)

(58) Field of Classification Search
CPC .............. G02B 2006/12142; G02B 2006/125; G02B 2006/2713; G02B 2006/2773; G02F 1/2255
USPC .................................................. 385/2, 11, 33
See application file for complete search history.

(56) References Cited

U.S. PATENT DOCUMENTS

| | | | | | |
|---|---|---|---|---|---|
| 4,343,535 | A | * | 8/1982 | Bleha, Jr. .......................... 349/9 |
| 4,472,797 | A | * | 9/1984 | Nicia .................................. 398/43 |
| 5,982,539 | A | * | 11/1999 | Shirasaki ................. 359/484.05 |
| 6,167,174 | A | * | 12/2000 | Zhang et al. ..................... 385/33 |

(Continued)

FOREIGN PATENT DOCUMENTS

JP    A-11-258454    9/1999
JP    A-2000-098156   4/2000

(Continued)

OTHER PUBLICATIONS

International Search Report for International Application No. PCT/JP2010/066580 (Oct. 19, 2010) with English translation.

(Continued)

*Primary Examiner* — Peter Radkowski
(74) *Attorney, Agent, or Firm* — Merchant & Gould P.C.

(57) ABSTRACT

Provided is a small optical waveguide device with little reflected light, the optical waveguide device including: an optical waveguide element of which a first output waveguide is inclined with respect to an output end face and a second output waveguide is inclined with respect to both the first output waveguide and the output end face; and a lens that allows beams respectively output from the first and second output waveguides to be parallel to each other.

12 Claims, 4 Drawing Sheets

(56) References Cited

U.S. PATENT DOCUMENTS

| | | | |
|---|---|---|---|
| 6,607,313 B1* | 8/2003 | Farries et al. | 398/102 |
| 6,741,764 B2* | 5/2004 | Wu et al. | 385/11 |
| 2004/0246853 A1* | 12/2004 | Imai | 369/53.19 |
| 2006/0114543 A1* | 6/2006 | Bloom | 359/279 |
| 2006/0133713 A1* | 6/2006 | Yamada et al. | 385/5 |
| 2007/0285553 A1* | 12/2007 | Morita et al. | 348/335 |
| 2010/0067900 A1* | 3/2010 | Ishikawa et al. | 398/7 |

FOREIGN PATENT DOCUMENTS

| | | |
|---|---|---|
| JP | A-2001-036505 | 2/2001 |
| JP | A-2002-252420 | 9/2002 |
| JP | A-2003-204116 | 7/2003 |
| JP | A-2004-006439 | 1/2004 |
| JP | A-2004-317626 | 11/2004 |
| JP | A-2005-157302 | 6/2005 |
| JP | 2006047956 A * | 2/2006 |
| JP | A-2006-047956 | 2/2006 |

OTHER PUBLICATIONS

Office Action for Japanese Patent Application No. 2009-225725 (Oct. 19, 2010) with English translation.

* cited by examiner

OPTICAL WAVEGUIDE DEVICE

This application is a U.S. National Stage Application under 35 U.S.C. §371 of International Patent Application No. PCT/JP2010/066580, filed 24 Sep. 2010, which claims the benefit of priority to Japanese Patent Application No. 2009-225725 filed 30 Sep. 2009, the disclosures of all of which are hereby incorporated by reference in their entireties. The International Application was published in Japanese on 4 Apr. 2011 as WO 2011/040339.

TECHNICAL FIELD

The present invention relates to an optical waveguide device.

BACKGROUND ART

An existing optical waveguide device will be described by exemplifying a Modulator with Polarization Beam Combiner shown in FIG. 4. For example, modulated beams of 20 Gb/s are output from output waveguides 108 and 109 of a modulator body 11. The output beam from the output waveguide 108 is input to a element to combine polarization beam (a Savart plate) 40 through a lens 50 and a prism 60. When the output beam from the output waveguide 109 passes through a ½-wave plate 30c, the polarization plane thereof rotates by 90°, and the beam is input to the element to combine polarization beam 40 through the lens 50 and the prism 60. Two beams of which the polarization planes are inclined with respect to each other by 90° are output to the same optical path by the element to combine polarization beam 40. In this way, a modulated beam of 40 Gb/s is obtained by combining the modulated beams of 20 Gb/s of which the polarization planes are inclined with respect to each other by 90°.

CITATION LIST

Patent Literature

[PTL 1] Japanese Patent Application Laid-Open No. 2002-252420

SUMMARY OF INVENTION

Technical Problem

However, in the configuration of FIG. 4, since the output waveguides 108 and 109 are installed so as to be perpendicular to the end face, there are problems in that the reflection at the end face is large and the reflected light return to the output waveguides 108 and 109 is large.

Further, in the configuration of FIG. 4, there is a need to use a prism 60 so that two beams incident to the element to combine polarization beam 40 are changed into collimated parallel beams, which disturbs a decrease in the size of the optical waveguide device.

The invention is made in view of the above-described circumstances, and it is an object of the invention to provide a small optical waveguide device with little reflected light.

Solution to Problem

The invention is made to solve the above-described problems. According to the invention, there is provided an optical waveguide device including: an optical waveguide element of which a first output waveguide is inclined with respect to an output end face and a second output waveguide is inclined with respect to both the first output waveguide and the output end face; and a lens that allows the beams respectively output from the first and second output waveguides to be parallel to each other.

Further, according to the optical waveguide device of the invention, the first and second output waveguides preferably are symmetrical to each other with respect to the normal line of the output end face.

Further, according to the optical waveguide device of the invention, the lens preferably allow the beams respectively output from the first and second output waveguides to be collimated beams parallel to each other.

Further, according to the optical waveguide device of the invention, the optical waveguide device preferably includes: a polarization beam rotating unit that rotates the polarization of the beam output from the optical waveguide element or the lens; and a polarization beam combining unit that combines differently polarized beams.

Further, according to the optical waveguide device of the invention, the optical waveguide element preferably include first and second optical modulating units, and is an optical modulator that outputs modulated beams using the first and second optical modulating units from the first and second output waveguides.

Advantageous Effects of Invention

According to the invention, it is possible to provide a small optical waveguide device with little reflected light.

DETAILED DESCRIPTION

Figure 1:
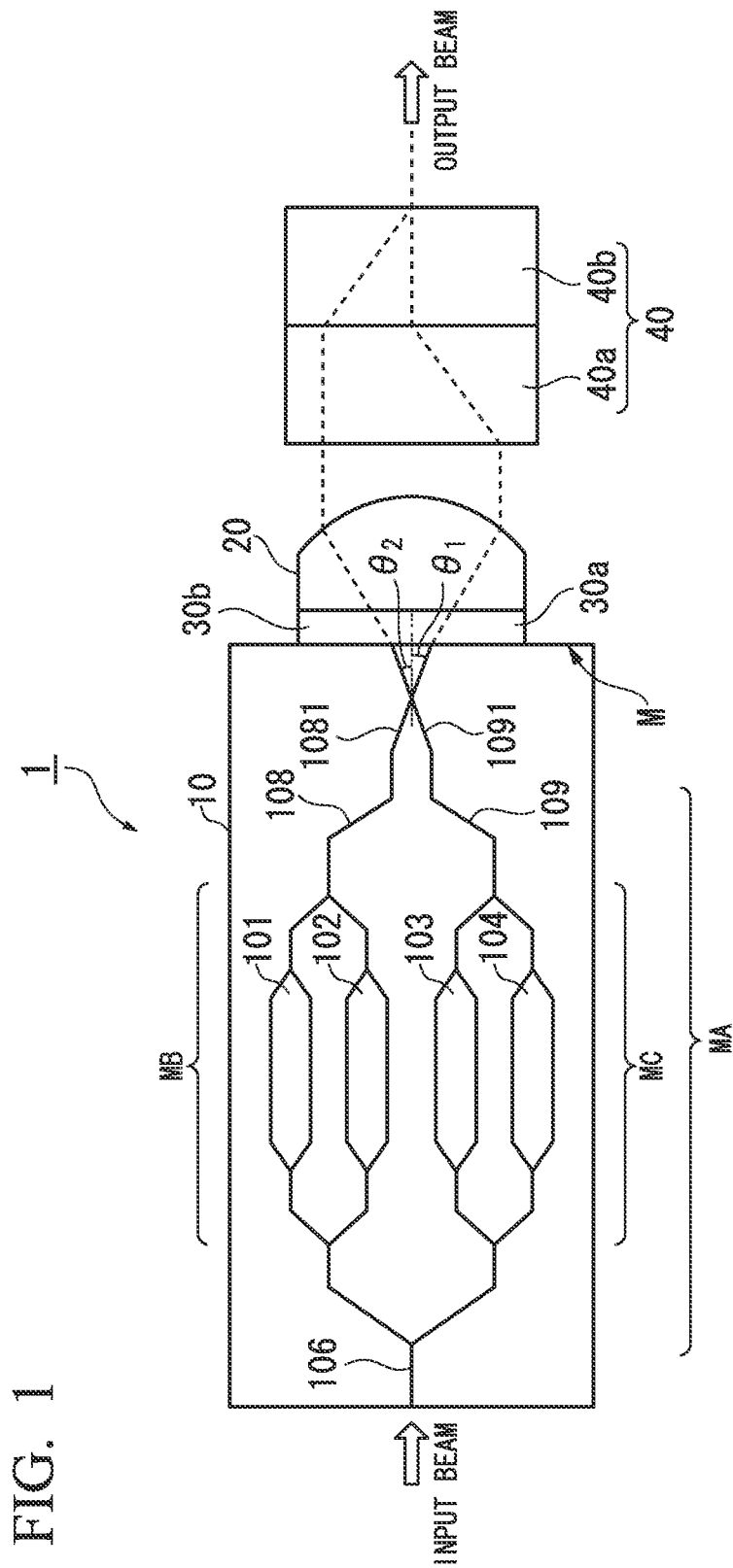
FIG. 1 is a top view illustrating a configuration of an optical waveguide device according to an embodiment of the invention.

Hereinafter, an embodiment of the invention will be described in detail by referring to the drawings.

FIG. 1 is a top view illustrating a configuration of an optical waveguide device according to the embodiment of the invention. The optical waveguide device 1 is a Modulator with Polarization Beam Combiner that outputs a beam that combined modulated and polarized beams, and includes: a modulator body 10 which modulates an input beam; ½-wave plates 30a and 30b (rotating units) which rotate the polarizations of the beams output from the modulator body 10; a cylindrical lens 20 which collimates the beams output from the ½-wave plates 30a and 30b and changes the optical axises of the beams so as to be parallel to each other; and an element to combine polarization beam 40 (a combining unit) which combines beams having different polarizations output from the cylindrical lens 20 so that the optical axes match each other.

The modulator body 10 is an optical waveguide element (LN optical modulator) in which optical waveguides and a modulation electrodes are mounted on a substrate formed of lithium niobate (LiNbO$_3$: referred to as LN).

The optical waveguides of the modulator body 10 has a nest structure in which both arms of a Mach-Zehnder waveguide MA are equipped with Mach-Zehnder waveguides MB and MC, both arms of the Mach-Zehnder waveguide MB are equipped with Mach-Zehnder waveguides 101 and 102, and both arms of the Mach-Zehnder waveguide MC are equipped with Mach-Zehnder waveguides 103 and 104. That is, the input beam toward the modulator body 10 is introduced into an input waveguide 106 of the Mach-Zehnder waveguide MA, and is branched into the Mach-Zehnder waveguides MB and MC on the arms. Further, the beam which is input to the Mach-Zehnder waveguide MB is branched into the Mach-Zehnder waveguides 101 and 102, and the beam which is input to the Mach-Zehnder waveguide MC is branched into the Mach-Zehnder waveguides 103 and 104. Then, the output beams from the Mach-Zehnder waveguides 101 and 102 are multiplexed by the Mach-Zehnder waveguide MB and are introduced into the arm 108 of the Mach-Zehnder waveguide MA. The output beams from the Mach-Zehnder waveguides 103 and 104 are multiplexed by the Mach-Zehnder waveguide MC and are introduced into the arm 109 of the Mach-Zehnder waveguide MA.

The Mach-Zehnder waveguides 101 to 104 (the optical modulating units) form an LN optical modulator together with the modulation electrodes (not shown) respectively installed therein. For example, a driving signal of 10 Gb/s is applied from a driving circuit (not shown) to the modulation electrode of each of the LN optical modulators 101 to 104, and each of the LN optical modulators 101 to 104 outputs a modulated beam which is modulated into 10 Gb/s. As the modulation type of the LN optical modulators 101 and 102 of the Mach-Zehnder waveguide MB, DQPSK (differential quadric-phase shift keying) is used herein. The same applies to the modulation types of the LN optical modulators 103 and 104 of the Mach-Zehnder waveguide MC. The beams which are introduced into the arms 108 and 109 of the Mach-Zehnder waveguide MA by DQPSK becomes a modulated beams of 20 Gb/s.

The arm 108 of the Mach-Zehnder waveguide MA is formed so that the vicinity (an output waveguide 1081) of one end face M of the LN substrate (the modulator body 10) forms an angle $\theta_1$ with respect to the normal line of the end face M. Further, in the same way, the arm 109 of the Mach-Zehnder waveguide MA is formed so that the vicinity (an output waveguide 1091) of the end face M forms an angle θ2 with respect to the normal line of the end face M. In this way, since the output waveguides 1081 and 1091 are inclined with respect to the end face M, the reflected light from the end face M toward the output waveguides 1081 and 1091 may be reduced.

Here, it is desirable to set the angles $\theta_1$ and $\theta_2$ formed between the output waveguides 1081 and 1091 and the normal line of the end face M to be in the range of, for example, 2° to 4°. In the case of $\theta_1=\theta_2=2°$, the reflection loss (return loss) in the end faces M of the output waveguides 1081 and 1091 becomes 30 dB. In the case of $\theta_1=\theta_2=3.5°$, the reflection loss becomes 55 dB. On the contrary, the reflection loss is 13 dB when the output waveguides 1081 and 1091 are perpendicular to the end face M, that is, $\theta_1=\theta_2=0°$. Accordingly, compared to this case, in this embodiment, the reflected light from the end face M toward the output waveguides 1081 and 1091 is drastically reduced.

The ½-wave plate 30a rotates the polarization plane of the beam output from the output waveguide 1081 by 45°. Further, the ½-wave plate 30b rotates the polarization plane of the beam output from the output waveguide 1091 by 45° in a direction opposite to that of the beam output from the output waveguide 1081. Accordingly, the polarization planes of the beam output from the ½-wave plate 30a and the beam output from the ½-wave plate 30b are inclined with respect to each other by 90°.

With regard to the cylindrical lens 20, the refractive index of the lens, the curvature of the lens curved face, and the thickness of the lens are set so that the beams output from the ½-wave plates 30a and 30b are collimated and the optical axes of the beams passing through the cylindrical lens 20 are parallel to each other. Since the beams which are incident to the cylindrical lens 20 are disposed so as to be inclined with respect to the optical axis of the cylindrical lens 20, the beams output from the cylindrical lens 20 may be parallelized when the refractive index of the cylindrical lens 20, the curvature thereof, and the thickness thereof are adjusted in this way. Accordingly, there is no need to install a prism 60 which changes the optical path as in the existing configuration of FIG. 2, which may realize a decrease in the number of components and a decrease in the size thereof.

In the element to combine polarization beam 40, two beams, which are incident to the different incident positions with polarization planes different by 90°, from the cylindrical lens 20, are output to the same optical path. Accordingly, a modulated beam of 40 Gb/s is obtained by combining modulated beams of 20 Gb/s of which the polarization planes are inclined with respect to each other by 90°. As the element to combine polarization beam 40, for example, an element formed from rutile or calcite may be used. However, particularly, it is desirable to use a Savart plate which is formed by bonding two plates (the polarizing and separating plates 40a and 40b) having the same thickness and formed from rutile or the like so that the optical axes are perpendicular to each other. When the Savart plate is used, since the optical lengths of the beam from the arm 108 and the optical lengths of the beam from the arm 109 are equal, two beams may be polarized and combined with no difference in the optical path.

While the embodiment of the invention has been described by referring to the drawings, the detailed configuration is not limited to the above-described configuration, and the design and the like may be modified into various forms within the scope of the concept of the invention.

Figure 2:
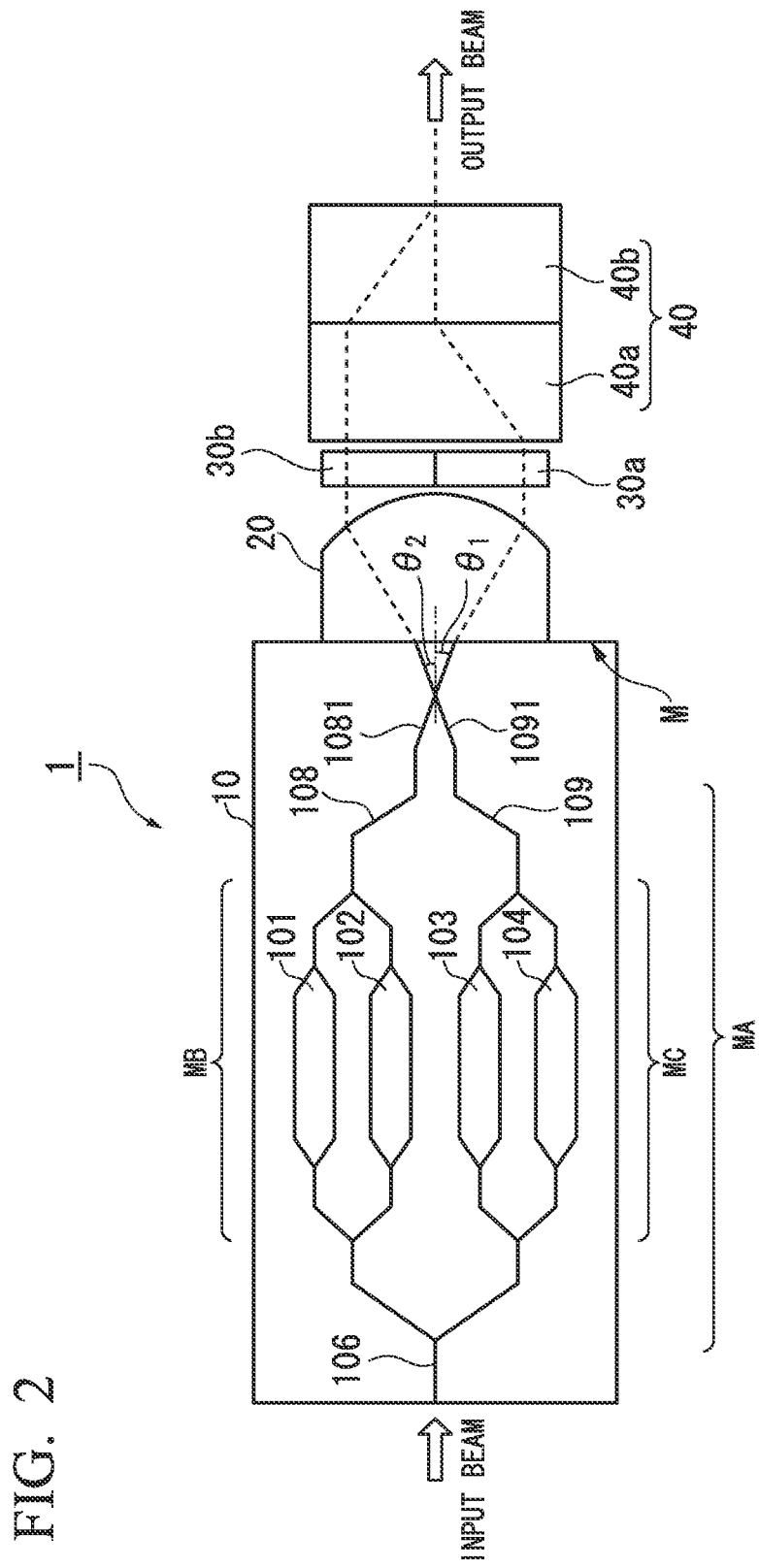
FIG. 2 is a top view illustrating a configuration of the optical waveguide device according to an embodiment of the invention.

For example, the rotation angle of the polarization plane using the ½-wave plate 30a may be 90°, and the rotation angle of the polarization plane using the ½-wave plate 30b may be 0°. Further, as shown in FIG. 2, the ½-wave plate 30a and the ½-wave plate 30b may be installed between the cylindrical lens 20 and the element to combine polarization beam 40.

Further, instead of the cylindrical lens 20, a Selfoc lens may be used. When the refractive index distribution and the thickness (the length in the optical axis direction) of the Selfoc lens are appropriately set, the beams output from the ½-wave plates 30a and 30b may be collimated and the optical axes of the beams passing through the Selfoc lens may be parallel to each other.

Figure 3:
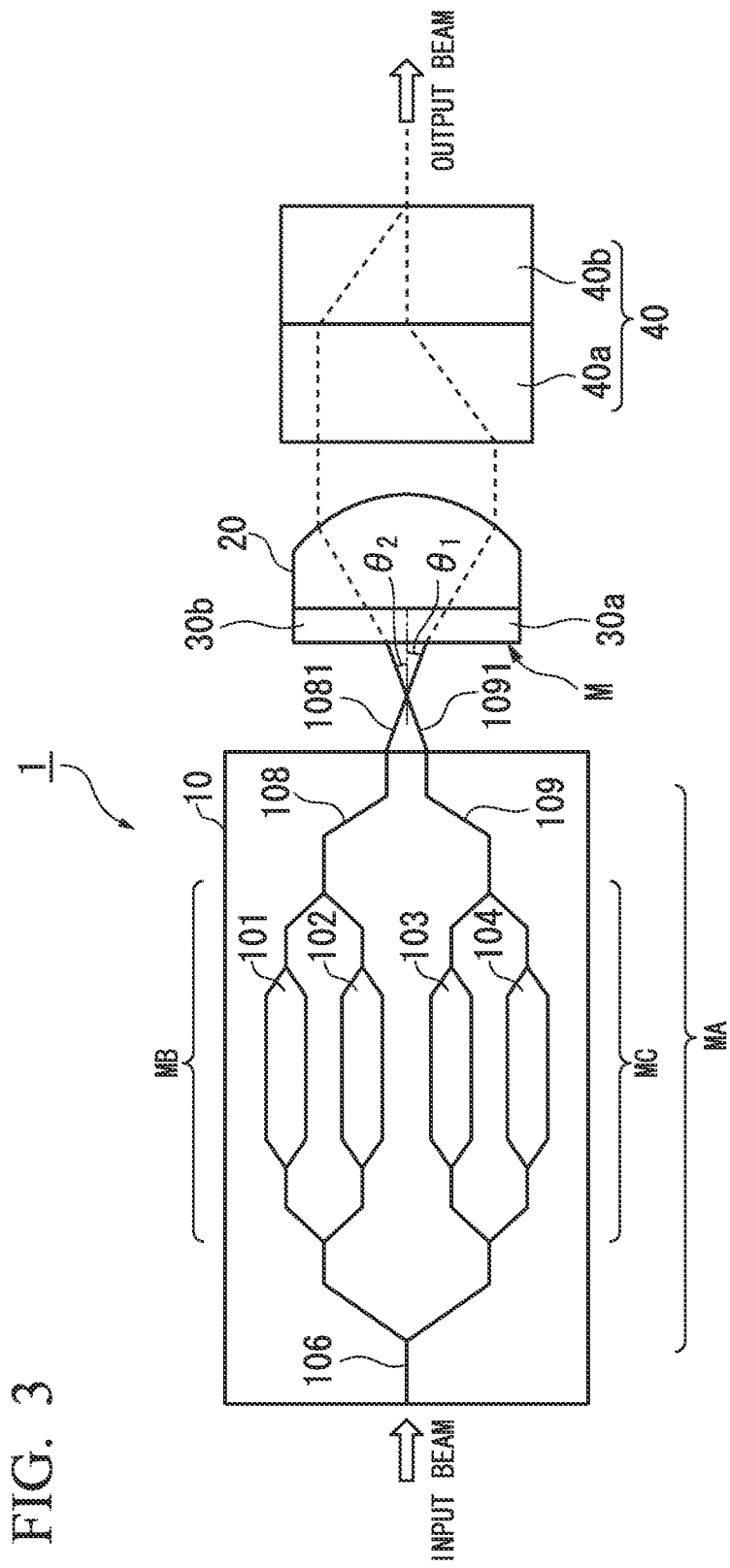
FIG. 3 is a top view illustrating a configuration of the optical waveguide device according to an embodiment of the invention.
Figure 4:
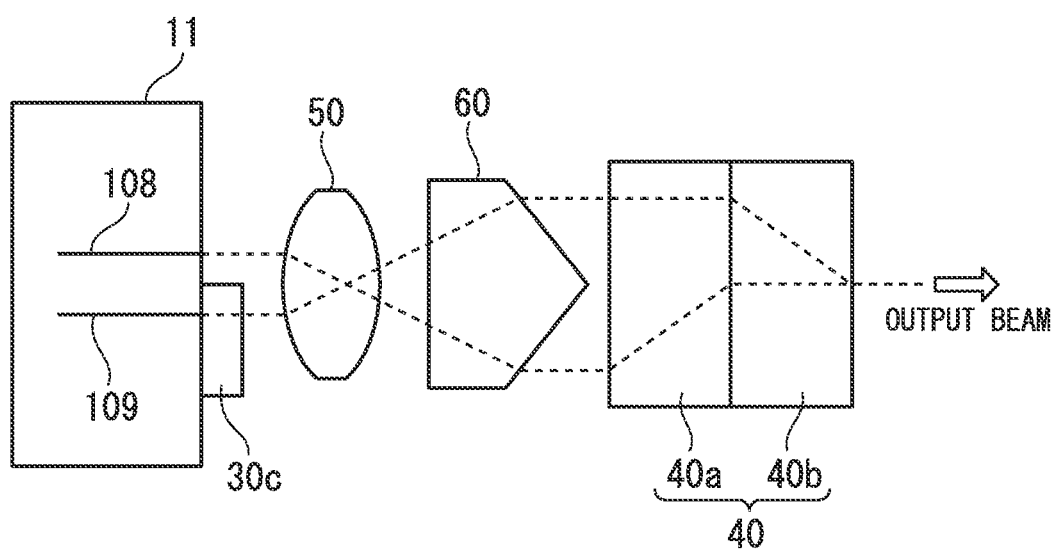
FIG. 4 is a top view illustrating a configuration of an existing optical waveguide device.

Further, as described above, the output waveguides 1081 and 1091 need to form the angles $\theta_1$ and $\theta_2$ with respect to the normal line of the end face M, but may not necessarily intersect each other inside the LN substrate (the modulator body 10) as shown in FIG. 1 (FIG. 3).

Further, in the above-described embodiment, the Modulator with Polarization Beam Combiner has been exemplified, but the invention is not limited thereto. That is, the invention may be applied to the optical waveguide element other than the LN optical modulator.

INDUSTRIAL APPLICABILITY

According to the invention, it is possible to provide a small optical waveguide device with little reflected light.

REFERENCE SIGNS LIST

1: OPTICAL WAVEGUIDE DEVICE
10: MODULATOR BODY
MA, MB, MC, 101 TO 104: MACH-ZEHNDER WAVEGUIDE
106: INPUT WAVEGUIDE
108, 109: ARM OF MACH-ZEHNDER WAVEGUIDE
1081, 1091: OUTPUT WAVEGUIDE
20: CYLINDRICAL LENS
30a, 30b: ½-WAVE PLATE
40: ELEMENT TO COMBINE POLARIZATION BEAM
40a, 40b: POLARIZING AND SEPARATING PLATE

We claim:

1. An optical waveguide device comprising:
an optical modulator which modulates an input beam,
a rotating unit which rotates the polarization of at least one beam's output from the optical modulator,
a lens, and
a combining unit which combines beams having different polarizations output from the lens, wherein
the optical modulator comprises a first output waveguide which is inclined with respect to an output end face and a second output waveguide which is inclined with respect to both the first output waveguide and the output end face;
the first output waveguide and the second output waveguide are configured to output a first modulated beam and a second modulated beam respectively from the output end face,
the first and the second modulated beams are incident with respect to the lens while optical axes thereof are maintained in a non-parallel state, and
the lens allows the first and the second modulated beams to be collimated beams having respective first and second optical axes that are parallel to each other.

2. The optical waveguide device according to claim 1, wherein the optical modulator comprises first and second optical modulating units, and the first and second modulated beams are output by using the first and second optical modulating units from the first and the second output waveguides.

3. The optical waveguide device according to claim 1, wherein the optical modulator comprises optical waveguides and modulation electrodes.

4. The optical waveguide device according to claim 1, wherein the rotating unit is a ½-wave plate.

5. The optical waveguide device according to claim 1, wherein the combining unit is a Savart plate.

6. The optical waveguide device according to claim 3, wherein the optical modulator comprises a first Mach-Zehnder waveguide which further comprises a second Mach-Zehnder waveguide and a third Mach-Zehnder waveguide.

7. The optical waveguide device according to claim 1, wherein an angle $\theta_1$ and an angle $\theta_2$, which the first and second output waveguides form with respect to a normal line of the output end face of the optical modulator, respectively, are equal.

8. The optical waveguide device according to claim 7, wherein the angles $\theta_1$ and $\theta_2$ are within the range from 2° to 4°.

9. The optical waveguide device according to claim 1, wherein the first output waveguide is inclined with respect to the output end face, and the second output waveguide is formed in liner symmetry with respect to the first output waveguide, using the normal line of the output end face of the optical modulator as a symmetry axis.

10. The optical waveguide device according to claim 1, wherein a prism is not installed between the lens and the polarization beam rotating unit.

11. The optical waveguide device according to claim 1, wherein the optical waveguide device is a modulator with polarization beam combiner that outputs a beam combined modulated and polarized beams.

12. The optical waveguide device according to claim 1, wherein the first output waveguide and the second waveguide cross each other and extend linearly toward the output end face.

* * * * *